United States Patent [19]

Lutke et al.

[11] 4,005,901
[45] Feb. 1, 1977

[54] VEHICLE ROOF WITH A MOVABLE PANEL

[75] Inventors: Helmut Lutke, Buttgen-Driesch; Willi Schalude, Geyen, both of Germany

[73] Assignee: Ford Motor Company, Dearborn, Mich.

[22] Filed: Jan. 23, 1976

[21] Appl. No.: 651,879

[30] Foreign Application Priority Data

Feb. 27, 1975  Germany .......................... 2508487

[52] U.S. Cl. .............................. 296/137 B; 16/172; 292/DIG. 5
[51] Int. Cl.² ........................................... B60J 7/18
[58] Field of Search ................... 296/137 B, 137 R; 49/394, 465, 261, 397; 74/520; 292/113, 247, DIG. 5; 16/172, 171

[56] References Cited

UNITED STATES PATENTS

| | | | |
|---|---|---|---|
| 2,138,816 | 12/1938 | Holt et al. | 49/397 |
| 2,799,890 | 7/1957 | Stavich | 16/172 |
| 3,913,971 | 10/1975 | Green | 296/137 B |
| 3,949,624 | 4/1976 | Bienert | 296/137 B |
| 3,955,848 | 5/1976 | Lutz et al. | 296/137 B |

Primary Examiner—Robert R. Song
Attorney, Agent, or Firm—John J. Roethel; Keith L. Zerschling

[57] ABSTRACT

A vehicle roof having a movable panel arranged in a framed roof aperture, the rear edge of the panel being deployable outwardly and facility being provided for the complete detachment of the panel from the roof frame. The front or leading edge of the panel is attached to the roof frame through two detachable hinge components and the rear edge is attached through a detachable deploying mechanism.

9 Claims, 5 Drawing Figures

VEHICLE ROOF WITH A MOVABLE PANEL

BACKGROUND OF THE INVENTION

It is known in the prior art to install in an aperture in a vehicle roof a movable panel having its front edge attached to a roof frame framing the aperture through detachable hinge components and its edge through a detachable deploying mechanism. In the known installation the detachable hinge components consist in each case of an elastic sleeve inserted in a slotted hole in the roof frame, and of a substantially flat hinge tongue assembled therein, the end of the tongue being bent upwards and the tongue being attached to the panel. The axis of pivot of these hinge components here extend substantially along the edges, rounded off by the elastic sleeve, of the slotted holes in the roof frame. The detachable deploying mechanism here consists of two lateral lever arrangements in which the pivot pins, in each case axially connected to deploying levers, are designed for axial dismantlement.

The known vehicle roof exhibits two critical drawbacks:

The known detachable hinge components cannot prevent twisting of the panel during the deploying action, particularly if the two lateral lever arrangements do not operate uniformly, so that twisting and cross-binding can give rise to faulty operation. Moreover, because of the position of the axis of pivot, which is in front of but below the forward edge of the panel, the deploying motion of the panel gives rise to a slight shift forward on the part of the forward edge. As a result, during the opening motion the panel is pressed harder against the sealing strip surrounding it giving rise to increased sealing strip deformation. During the closing motion, the panel edge retreats from the sealing strip with the result that leaks can develop in the zone where the strip has undergone severe deformation.

In this context, the pivot pins of the two detachable lateral pair of deploying levers must, during detachment of the panel, be removed by two successive manipulations performed with one hand, or by two simultaneous manipulations performed by both hands. It is only when this has been done that the panel can be gripped with both hands and lifted out of the roof aperture. The removal of the panel from the roof aperture is therefore a relatively laborous and difficult operation. Moreover, it is still more difficult, after the panel has been placed in the roof aperture, to insert the two pivot pins for the two detachable lateral pairs of deploying levers in such a way that the said lever pairs are connected together.

It is therefore the object of the present invention to so improve a vehicle roof of the kind above described, that while having a simple structure, it will operate reliably and can be quickly and easily detached and fitted.

SUMMARY OF THE INVENTION

The present invention relates to a vehicle roof having a movable panel arranged in a framed roof aperture. The rear edge of the panel is deployable outwardly of the aperture and a facility is provided for the complete detachment of the panel from the roof frame. The front edge of the panel is attached to the roof frame through spaced detachable hinge components and the rear edge through a detachable deploying mechanism.

The improvement comprises the detachable hinge components constituting fixed hinge housings attached to the roof frame. Each housing contains a circular arcuate passage. Flexible hinge tongues attached to the panel are received within the respective passages in the housing. The tongues provide common hinge axes about which the panel is pivotally movable, the hinge axes being located in front of and above the forward edge of the panel.

The detachable deploying mechanism constitutes a handle articulated to the panel by a first pivot means journalled in the support attached to the panel. The deploying lever is attached to the handle to form a toggle link. The deploying lever is articulated by a second pivot means to the roof frame through a support forming a bearing therefore. One of the pivot means is disengageable from a support to provide for disconnection of the detachable deploying mechanism.

The disengageable pivot means may either be the pivot means between the handle and the panel or the pivot means articulating the deploying lever to the roof frame. Preferably, the disengagable pivot means comprises axially retractable pins, the pins being coupled to retracting levers movable toward each other.

The detachable hinge components in accordance with the present invention, in conjunction with a single central deploying mechanism, prevent unwanted twisting of the panel during the deploying action. Moreover, because of the position of the pivot axis, which is in front of and above the forward edge of the panel, the forward edge shifts toward the rear during the panel deploying action so that when the panel is opened it moves positively clear of its surrounding sealing strip, while when the panel is closed it moves firmly into contact with the sealing strip. The detachable deploying mechanism in accordance with the present invention is in the form of a well known kind of toggle lever arrangement that can be operated quite simply by one hand and actuating levers which can be moved towards one another by thumb and forefinger action. This makes it possible, through axially retractable pivot pins, to detach the deploying mechanism quite simply by a single manipulation.

The detachment of the panel from and its fitting into the roof aperture can thus be performed simply and rapidly, the panel being gripped by one hand at the deploying mechanism arranged at its rear edge and released by operating the actuating levers, while with the other or free hand holding the front edge, it can be lifted away upwards and rearwards. Refitting of the panel in the aperture is performed in the reverse order, the pivot pins of the deploying mechanism automatically engaging in their bores in the lever arrangement through the medium of chamfers.

DESCRIPTION OF THE DRAWINGS

Further features and advantages of the present invention will be made more apparent as this description proceeds, reference being had to the accompanying drawings wherein.

DETAILED DESCRIPTION OF THE INVENTION

Figure 1:
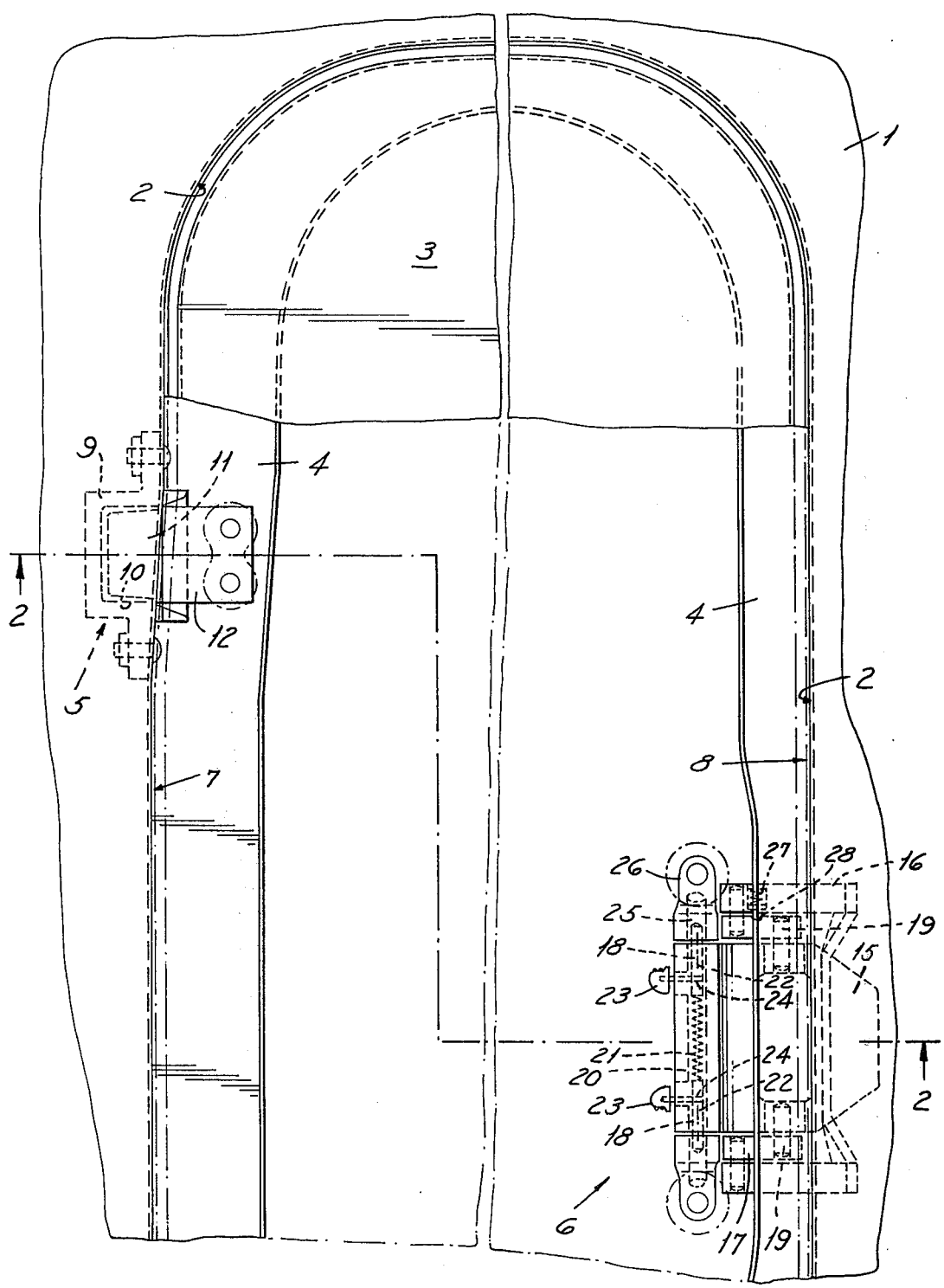
FIG. 1 illustrates a plan view on a reduced scale of one side of the vehicle roof embodying the removable panel in accordance with the present invention.

Referring now to the drawings, FIG. 1 discloses a vehicle roof 1 containing an aperture 2 in which a panel 3 is arranged. The roof aperture 2 is surrounded by a roof frame 4 in a conventional manner, the roof frame 4 being attached to the vehicle roof 1 through bent rim flanges and forming a supporting facility for detachable hinge components generally designated 5 and a releasable deploying mechanism generally designated 6.

The panel 3 is articulated at its forward edge 7 through two detachable hinge components 5, and at its rear edge 8 through the releasable deploying mechanism 6, to the roof frame 4.

Each of the detachable hinge components 5 consists of a fixed hinged housing 9 attached to the roof frame 4, said housing exhibiting a circular arcuate passage 10 therein. The passage 10 extends forwards, and downwards and upwards, the passage 10 having a rectangular cross-section. Each detachable hinge component 5 further consists of a mobile or flexible hinge tongue 12 attached to the panel 3. The hinge tongue 12 has a circular arcuate section 11 and this section is assembled in the passage 10 in the hinge housing 9. An imaginary pivot axis 13, common to the circular arcuate passages 10 and the circular arcuate sections 11, is in this case located before and above the forward edge of the panel 3.

In order to prevent squeaking and rattling in the hinge components 5, at least one of the two components is made of synthetic material and provided, for example, with a velvet floc material 14 of the kind utilized in the window guides of motor vehicles in order to reduce noise and friction.

The detachable deploying mechanism 6 consists of a handle 15 articulated to the panel 3 and of a deploying lever 17 attached to the latter after the manner of a toggle lever linkage and articulated to the roof frame through a support forming a bearing component 16. One of the pivots 18 between the handle 15 and the panel 3 or the other pivot 19 between the deploying lever 17 and the handle 15 is designed to be releasable. In the present example, the pivot 18 is designed to be releasable. The handle 15 here contains a bore 20 in which the detent pins 22 can move axially in relation to one another against the force of a spring 21, under the control of actuating levers 23. The detent pins 22 can here be operated through pins 24 extending perpendicularly of their axis, which pins can move in slotted holes in handle 15 and are designed to carry the actuating levers 234 externally. The detent pins 22 are chamfered at their external ends so that when the deploying mechanism is attached, they automatically drop into the bores 25 in a bearing arrangement 26 attached to the panel 3.

In the support 16, on surfaces adjacent the deploying lever 17, spring loaded detent pins 27 are arranged which cooperate with detent locations 28 in the deploying lever 17 in order to locate the deploying mechanism in a fully opened or a fully closed position and, possibly, in an intermediate position.

Figure 2:
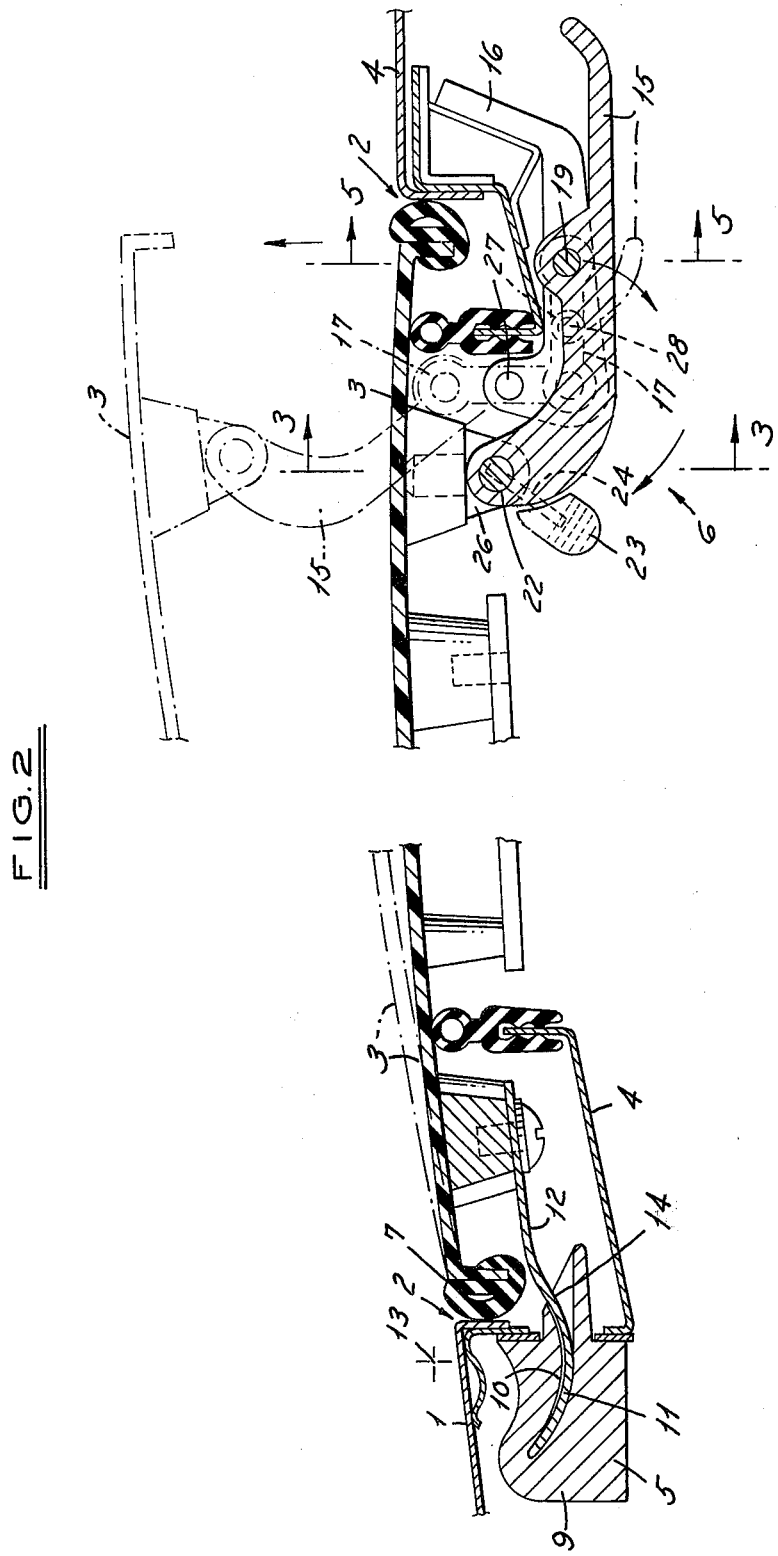
FIG. 2 illustrates a vertical section along the line 2—2 of FIG. 1 through a hinge component and a deploying mechanism.
Figure 3:
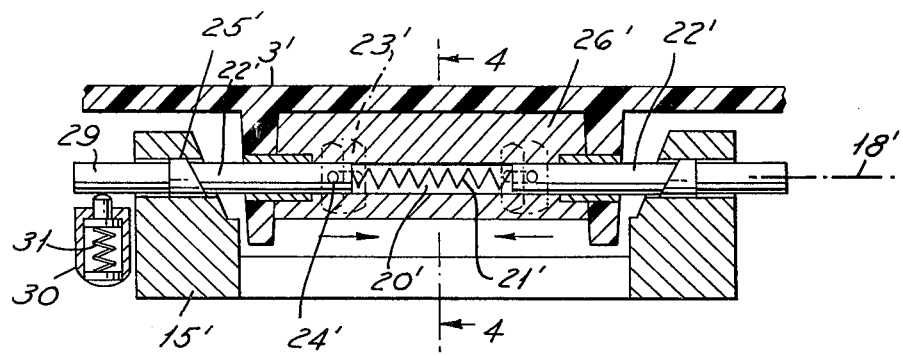
FIG. 3 illustrates a vertical section of a further embodiment of the invention in which the release mechanism would be located on the line 3—3 of FIG. 2.

FIG. 3 illustrates a vertical section on the line 3—3 of FIG. 2 of the kind that would be obtained if the release mechanism for the pivot pin 18 is arranged not in the handle 15 but in the bearing element 26. The bearing element 26, attached to the panel 3, here contains a bore 20 in which, against the force of a spring 21, two detent pins 22 can move axially in relation to one another, the detent pins being operable through the agency of pins 24 extending perpendicularly to them, plus actuating levers 23 attached thereto.

Figure 4:
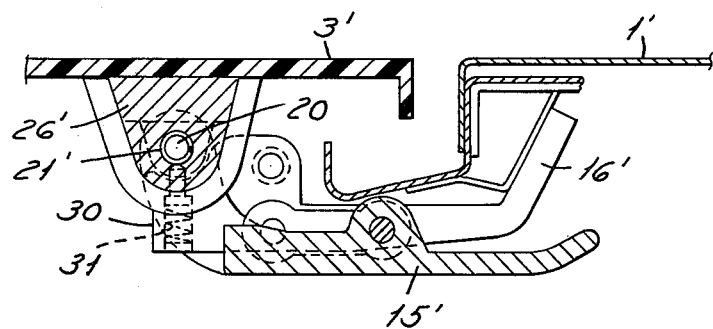
FIG. 4 illustrates a vertical section on the line 4—4 of FIG. 3, of a retainer latch for the toggle lever deploying mechanism being provided for the situation in which the panel has been removed from the aperture.

The handle 15 is here provided with lateral pins 29 which react against a projecting arm 30, on the bearing component 16 (see FIG. 4), equipped with sprung detents 31, in order, when the panel 3 is removed, to enable the toggle lever deploying mechanism to be fixed in its inoperative position.

Figure 5:
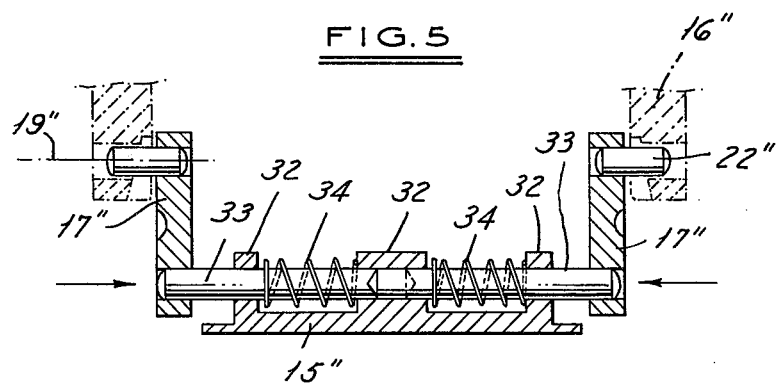
FIG. 5 illustrates a vertical section of a further embodiment of the invention in which the release mechanism would be located on the line 5—5 of FIG. 2.

In FIG. 5, a vertical section on the line 5—5 of FIG. 2 has been shown, corresponding to a situation in which the pivot pin 19 would be of releasable design. The handle 15 here exhibits three bearing lugs 32 for pivot pins 33 which are axially displaceable and fixed to the lateral deploying levers 17, the internal ends of which pins are given a flat finish and bear against one another so that although axial displacement of the pivot pins 33 relatively to one another is possible, they can only pivot simultaneously and commonly.

In order to release the deploying mechanism 6, the two deploying levers 17 are gripped externally using thumb and forefinger, and pressed together against the load of the springs 34. Consequently, the detent pins 22 disengage from the bores in the bearing components 16, releasing the deploying mechanism. Of course, in the bearing components 16 chamfers are provided which lead into the bores for the detent pins 22, these chamfers, when the deploying mechanism is being connected, enabling the detent pins 22 to engage automatically.

Self-evidently, all the components of the deploying mechanism 6 are arranged in recesses in the roof of the motor vehicle and can, if required, be made of synthetic material or metal, as well as exhibit foam material buffer plates to protect the vehicle occupants in the event of a collision.

It is to be understood that the invention is not limited to the exact construction illustrated and described above, but that various changes and modifications may be made without departing from the spirit and scope of the invention as defined by the following claims:

We claim:

1. A vehicle roof having a movable panel arranged in a framed roof aperture, the rear edge of the panel being deployable outwardly of the aperture and facility being provided for the complete detachment of the panel from the roof frame, the front edge of the panel being attached to the roof frame through spaced hinge components and the rear edge through a detachable deploying mechanism, wherein the improvement comprises the detachable hinge components constituting fixed hinge housings attached to the roof frame, each housing containing a circular arcuate passage, flexible hinge tongues attached to the panel received within the respective passages in the housing, the tongues providing common hinge axes about which the panel is pivotally moveable, the hinge axes being located in front of and above the forward edge of the panel, and the detachable deploying mechanism constituting a handle articulated to the panel by a first pivot means journalled in a support attached to the panel, a deploying lever attached to the handle to form a toggle link, the deploying lever being articulated by a second pivot means to the roof frame through a support forming a bearing therefore, one of the pivot means being disengageable from its support to provide for disconnection of the detachable deploying mechanism.

2. A vehicle roof according to claim 1, in which:

the disengageable pivot means is the pivot means between the handle and the panel.

3. A vehicle roof according to claim 2, in which:

the disengageable pivot means comprises axially retractable pins, the pins being coupled to retracting levers movable toward each other.

4. A vehicle roof according to claim 1, in which:

the disengageable pivot means is the pivot means articulating the deploying lever to the roof frame.

5. A vehicle roof according to claim 4, in which:

the disengageable pivot means comprises axially retractable pins, the pins being coupled to retracting levers movable toward each other.

6. A vehicle roof according to claim 1, in which:

at least one of the detachable hinge components is made of synthetic material and is provided with a velvet floc finish to reduce backlash and noise.

7. A vehicle roof as claimed in claim 1, in which:

spring-loaded detent pins are provided on the bearing forming support adjacent the deploying lever, the deploying lever having detent means engageable by the detent pins, the detent means being located to coact with the detent pins to hold the deploying mechanism in at least fully opened or fully closed position.

8. A vehicle roof as claimed in claim 7, in which:

a projecting arm having a spring-loaded detent is carried on the bearing forming support, and a laterally projecting pin on the handle is engageable with the spring-loaded detent to hold the toggle lever deploying mechanism in an inoperative position when the panel is removed from the roof aperture.

9. A vehicle as claimed in claim 1, in which:

a projecting arm having a spring-loaded detent is carried on the bearing forming support, and a laterally projecting pin on the handle is engageable with the spring-loaded detent to hold the deploying mechanism in an inoperative position when the panel is removed from the roof aperture.

* * * * *